United States Patent
Morikawa et al.

(10) Patent No.: US 7,843,401 B2
(45) Date of Patent: Nov. 30, 2010

(54) IMAGE DISPLAY APPARATUS

(75) Inventors: Osamu Morikawa, Tsukuba (JP); Kenji Toda, Tsukuba (JP); Toshihiro Katashita, Tsukuba (JP); Yohei Hori, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 1014 days.

(21) Appl. No.: 11/526,630

(22) Filed: Sep. 26, 2006

(65) Prior Publication Data

US 2007/0285342 A1 Dec. 13, 2007

(30) Foreign Application Priority Data

Mar. 27, 2006 (JP) .............................. 2006-086720

(51) Int. Cl.
G09G 5/00 (2006.01)
(52) U.S. Cl. .......................................... 345/4; 345/1.1
(58) Field of Classification Search .................. 345/1.1, 345/1.2, 1.3, 4
See application file for complete search history.

(56) References Cited

U.S. PATENT DOCUMENTS

| | | | | |
|---|---|---|---|---|
| 5,047,754 | A * | 9/1991 | Akatsuka et al. ............. | 345/163 |
| 6,759,997 | B2 * | 7/2004 | Someya et al. ............... | 345/1.1 |
| 6,864,921 | B2 * | 3/2005 | Kaneda et al. ............... | 348/383 |
| 2001/0006375 | A1 * | 7/2001 | Tomooka et al. .............. | 345/4 |
| 2003/0197659 | A1 * | 10/2003 | Arai .......................... | 345/1.1 |
| 2004/0113865 | A1 * | 6/2004 | Oku et al. .................... | 345/4 |

FOREIGN PATENT DOCUMENTS

JP 2001-148846 5/2001

OTHER PUBLICATIONS

Osamu Morikawa, et al.: "Image Federation on Multi-input Smart Display", Sep. 27, 2005, The Virtual Reality Society of Japan.

* cited by examiner

Primary Examiner—Richard Hjerpe
Assistant Examiner—Tom V Sheng
(74) Attorney, Agent, or Firm—Oblon, Spivak, McClelland, Maier & Neustadt, L.L.P.

(57) ABSTRACT

An image display apparatus for displaying image signals of a form of packets incorporating display position information includes a combination of unit display devices so as to acquire translational objectivity. Each of the unit display devices including a receiving part for receiving image signals, a processing part for dividing input image signals into those falling inside and those falling outside a range for display or those subject to or those not subject to display based on the display position information and serving to process display positions of the image signals falling outside the range for display or not subject to display, an output part for outputting the processed image signals along an axis of translational objectivity to a subsequent unit display device, and a display part for displaying the images falling in the range for display, the image display apparatus displaying the image signals as a whole, with the image signals processed sequentially with the unit display devices.

12 Claims, 8 Drawing Sheets

(x, y)=(1310, 400) → (670, 400) → (30, 400)

(x, y)=(50, 900) → (50, 420) , (50, 0)

IMAGE DISPLAY APPARATUS

BACKGROUND OF THE INVENTION

1. Field of the Invention

This invention relates to an image display apparatus using a bundle of plural image display devices as one complete display apparatus.

2. Description of the Prior Art

A conventional image display apparatus is so designed that in displaying an image signal from one image control device, the whole image plane may be occupied for the sake of the display. It enables the image of the display part of a television set, a personal computer or a measuring instrument to be displayed in such a state as to occupy the relevant image display apparatus. For the purpose of displaying a plurality of independent images, therefore, it is necessary that as many image display apparatus be prepared as the images desired to be displayed. Of course, time-division multiplexing or space multiplexing is conceivable. Namely, the idea of displaying a plurality of images on a single image display apparatus by implementing time-division multiplexing by the use of a switching device is feasible. Also, the idea of implementing space multiplexing by the use of an image plane dividing device, thereby producing a synthesized image composed of a plurality of images and displaying the synthesized image by inserting a plurality of image planes in one image plane is feasible. For the purpose of synthesizing a plurality of images and displaying the resultant synthesized image, it is necessary that a control device capable of performing the operation of synthesis be separately prepared. Contrary to the preceding case, the display of one image as apportioned among a plurality of display devices has been known as a multi-monitor display (or a multi-display) and has been finding popular acceptance. It consists in constructing an image display apparatus possessing a physically large image plane by concatenating a plurality of display devices. These display devices are individually caused by a common control device to display their respective image signals proper to the positions of the display devices in the complete display apparatus. Since the plurality of display devices are concatenated to construct a complete image display apparatus possessing a physically large image plane and the display devices are individually required to receive image signals cut out into the regions allocated to the display devices, it is necessary that a control device capable of supplying the plurality of display devices with the image signals of their own be prepared separately.

One image display apparatus enables simultaneous display of a plurality of material images differing in specification and, even when an image display apparatus is constructed by causing display devices to be arbitrarily aligned vertically and bilaterally in accordance with the principle of multi-display, one image can be displayed on the image display apparatus.

This invention enables simultaneous display of image materials differing in specification to be attained without entailing deterioration of image quality by providing an image display apparatus capable of simultaneously displaying a plurality of images without requiring preparation of a synthesized image. This invention also enables display of one image on the image display apparatus to be attained without requiring a control device even when the image display apparatus is constructed by causing the display devices to be arbitrarily aligned vertically and bilaterally.

This invention is aimed at enabling the contents displayed on television sets, personal computers and measuring instruments and the image data of varying forms of display, such as the digital cameras, portable telephone image planes, electronic books and electronic newspapers, to be displayed at optional positions in one image display apparatus in a possibly overlapping state and in a numerous quantity by converting varying image signals into a digital image signal conforming to a unified specification. Further, using this invention enables a continued display image plane to be obtained by concatenating display units and permits the continued display image plane to effect seamless display at optional positions in the plurality of display image planes as though they were one giant image plane from the beginning. The display devices to be concatenated may vary in resolution or image plane renewing interval as between monochrome and color or between still image and moving image. The user of the invention, therefore, is capable of combining display devices of his own choice disposed at positions of his own choice and handling them as one complete image display apparatus. The digital image signals to be used in this invention may have no relation with the size of the image plane of the display device. When the size of the image plane of the display device is 100×100 pixels and the size of the image signal is 120×80 pixels, for example, part of the image signal is displayed and the part of the image signal that protrudes from the display device is either displayed on another display device or discarded.

The image signal is caused to form an image signal packet that has a position designated for starting display. The display device, as illustrated in FIG. 1, is provided with a plurality of input-output terminals and at least one input-output terminal intended for the image display apparatus destined to be vertically, bilaterally and obliquely connected. The display devices function individually to read the position for starting display indicated in the image signal packet, judge the part of the range of display in the relevant display device and display the part. When a part falling outside the range of display happens to exist, the display position data of that part of the image signal packet is processed and output through the proper one of the input-output terminals. In case two or more image signal packets are to be displayed at the same position, the contents of the display are decided in accordance with the procedure established in advance and used for the display.

DISCLOSURE OF THE INVENTION

This invention provides as the first aspect thereof an image display apparatus for displaying image signals of a form of packets incorporating display position information, comprising a combination of unit display devices so as to acquire translational objectivity, each of the unit display device including a receiving part for receiving image signals, a processing part for dividing input image signals into those falling inside and those falling outside a range for display or those subject to or those not subject to display based on the display position information and serving to process display positions of the image signals falling outside the range for display or not subject to display, an output part for outputting the processed image signals along an axis of translational objectivity to a subsequent unit display device, and a display part for displaying the images falling in the range for display, the image display apparatus displaying the image signals as a whole, with the image signals processed sequentially with the unit display devices.

In the image display apparatus according to the first aspect, the unit display devices individually have one display surface and are aligned in rows and columns.

In the image display apparatus according to the first aspect, the unit display devices individually have two display surfaces formed collectively in a staggered pattern and are aligned in rows and columns.

In the image display apparatus according to the first aspect, the unit display devices are individually provided with an input terminal and output terminals connected to different unit display devices having translational objectivity in respective directions.

In the image display apparatus according to the first aspect, the processing part outputs the display position information that results from causing a portion of a size of a display region allocated to a unit display device to which the processing part belongs to be deducted from a display position of an image signal.

The image display apparatus according to the first aspect further comprises means for selecting an arbitrary display region from it, means for supplying the selected display region with a relatively large amount of image data and means for displaying the relatively large amount of image data in the selected display region to partly produce a high-definition image.

In the image display apparatus according to the first aspect, one unit display device to be connected to another unit display device is provided with four connecting ports for use in vertical and bilateral sides, and the unit display devices individually have a function of transmitting image data rewritten into position data minus or position data plus a number of pixels of the relevant display devices in vertical and bilateral directions in accordance with the connecting ports in the vertical and bilateral directions of the display device to automatically display relative position coordinates into which absolute position coordinates are converted.

In the image display apparatus according to the first aspect, the unit display devices are individually provided with means for displaying by default a pattern varied by an external request and means for inputting pattern positions proper to the relevant unit display devices or aligning the proper patterns to derive disposition of the relevant unit display devices, to thereby utilize these means as coordinates during a course of display.

The image display apparatus according to the first aspect further comprises means for reading position information of a relevant unit display device from contrast between an input image signal and an image signal shown in the unit display device, with an imaging camera connected to any one of the unit display devices and with a whole image display apparatus visualized in the image display apparatus, to derive disposition of the unit display devices, to thereby utilize this means as coordinates during a course of display.

The above and other objects, characteristic features and advantages of the present invention will become apparent to those skilled in the art from the description to be given herein below with reference to the accompanying drawings.

DETAILED DESCRIPTION OF THE PREFERRED EMBODIMENT

Figure 1:
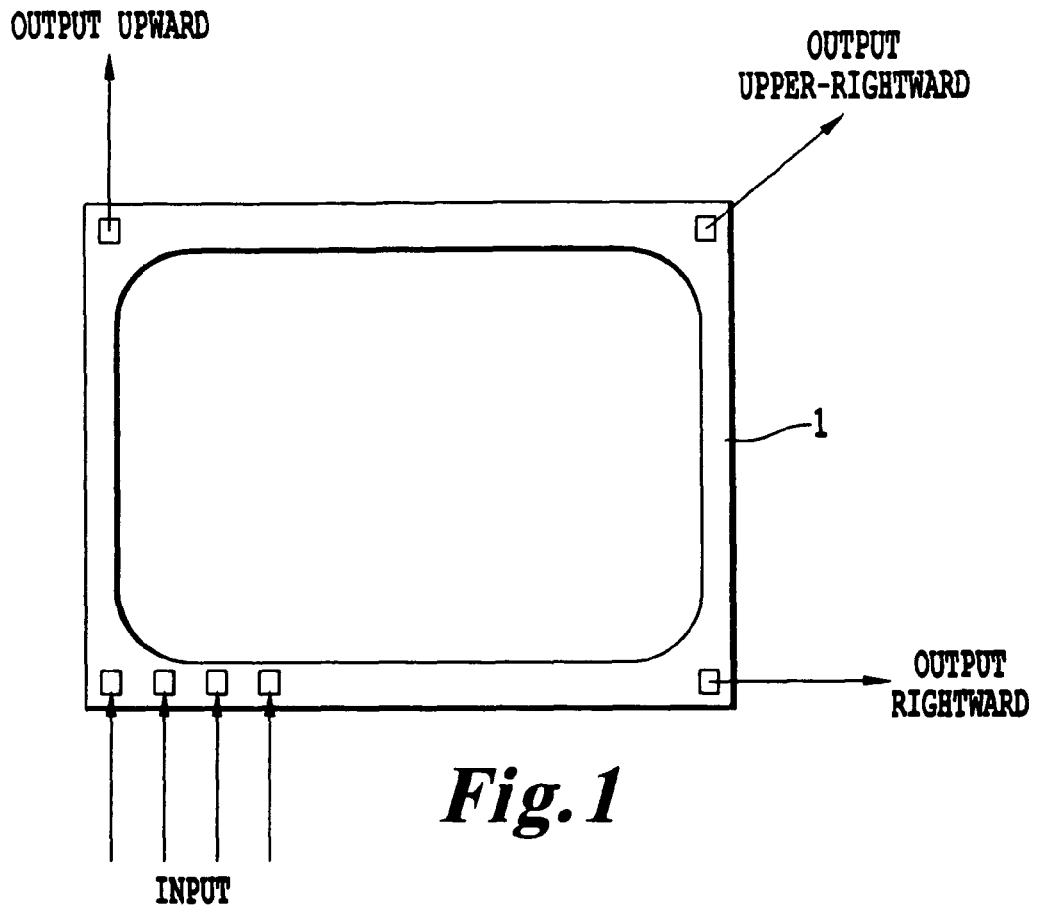
FIG. 1 is a schematic diagram illustrating a display device constituting a component of an image display apparatus contemplated by this invention.

Now, the embodiment of this invention will be described in detail below with reference to the accompanying drawings. In the following description, the component elements possessing an identical or similar function will be denoted by the like reference numerals unless in the presence of a special reason.

FIG. 1 illustrates a unit display device 1 which partakes in the construction of the image display apparatus of this invention. When the image display apparatus to be constructed is fated to assume a tetragonal display region having a large image plane, the unit display devices 1 are severally disposed from the left lower corner toward upward, rightward and obliquely rightward and wired. When this procedure is repeated on each of the unit display devices, the image display apparatus having a necessary display region is constructed. Though the display device 1 is depicted as possessing four inputs, it is required to have at least one input.

Figure 2:
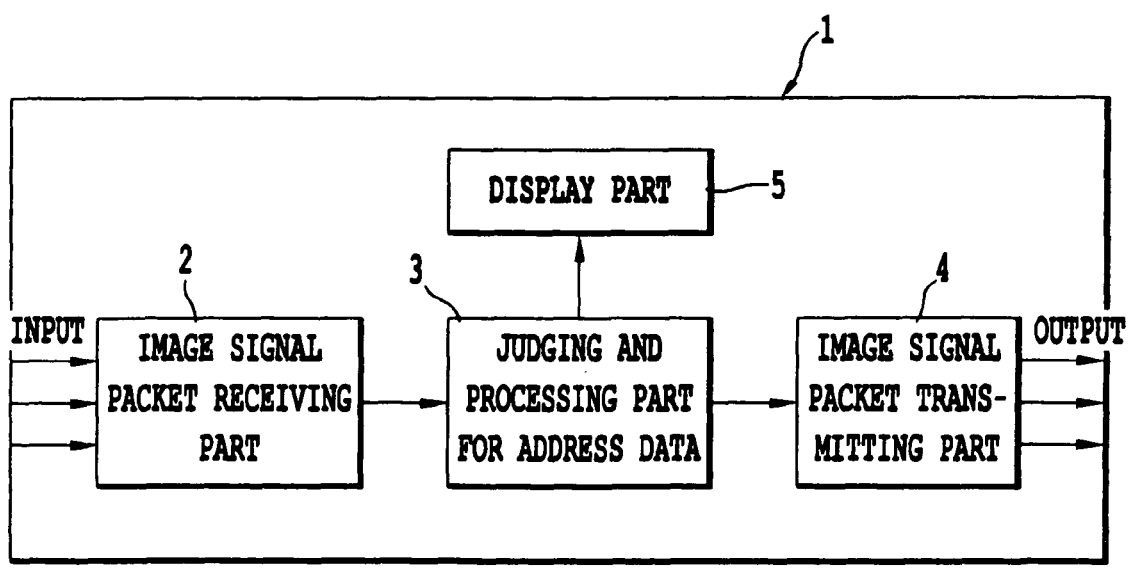
FIG. 2 is a schematic diagram illustrating the inside structure of the display device partaking in the construction of the image display apparatus of this invention.

The inside structure of the unit display device 1 partaking in the construction of the image display apparatus of this invention is illustrated in FIG. 2. The unit display device 1 illustrated in FIG. 2 comprises a receiving part 2 for simultaneously receiving a plurality of image signals of the form of an image signal packet, a processing part 3 for dividing the image signal packet into the interior and the exterior of display range and processing the data on the position for starting display of that packet (address) of the image signal packet outside the display range, a transmitting part 4 for outputting the processed image signal packet, and a display part 5 for displaying the image signal packet judged to fall in the display range. The construction of FIG. 2 enables expansion of the display range by causing a plurality of such unit display devices to be mutually connected.

While various methods are available for realizing the display part that serves to display the image signal packet falling in the display range, the method disclosed in Japanese Patent No. 3520318 directed to an image synthesizing and processing system, for example, may be adopted for this realization. In case display of two image signal packets at the same position is required, the content of display, namely the kind of image to be displayed, is decided by giving to the display part a synthetic control command data prepared in advance or a synthetic control command data synthesized from the relevant image signal packet.

Figure 3:
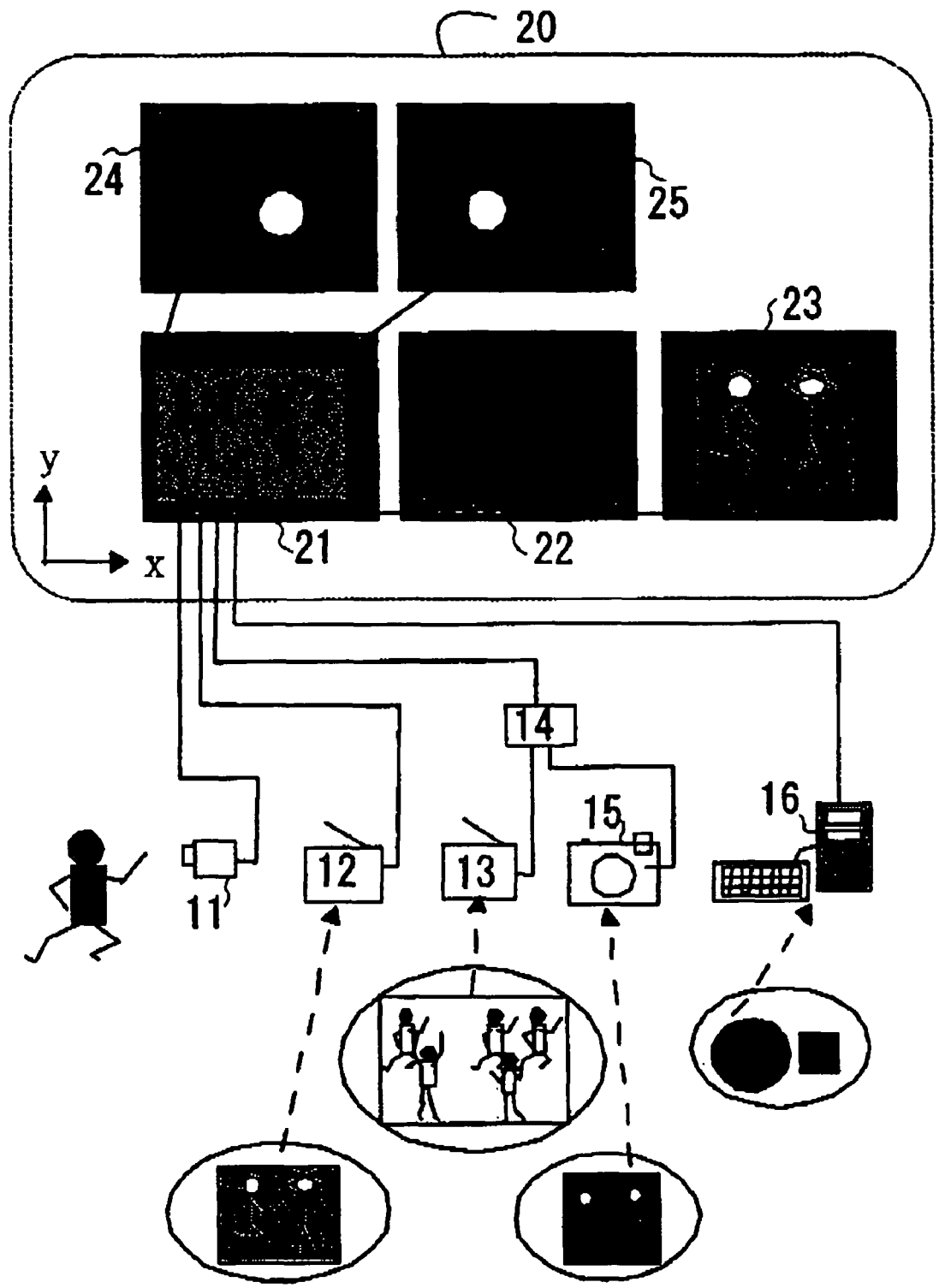
FIG. 3 is a schematic diagram illustrating an example of the image display apparatus of this invention.

An embodiment of the image display apparatus according to the present invention will be described. FIG. 3 illustrates an image display apparatus 20 obtained by connecting five unit display devices 21 to 25 of this invention individually provided with four inputs and input-output terminals of upper, right upper and right sides and consequently enabled to acquire a display image plane of a rectangle lacking the right upper part. The unit display devices have their respective display-limiting positions input and memorized in advance therein. FIG. 3 depicts the flow of the images of a video camera 11, tuners 12 and 13, a digital camera 15 and a personal computer 16 as inputs partly via a hub 14. The input signals from these component devices are invariably in the form of "an image signal packet having designated the position for starting display" which will be specifically described herein below. From the personal computer, two, i.e. one elliptic and one quadrilateral, signals are output. The input signals may be entered into the image display apparatus via any of the input terminals thereof. When the input terminals are not sufficient in number, the insufficiency may be coped with by branching the relevant wire by means of the hub 14. In the case of the image signal which has a larger number of pixels than one image display device can display, the digital camera 15 in FIG. 3, for example, when handing the image signal having such a number of pixels, causes this image signal to be automatically broken by the information of the position for starting display of the image signal and displayed in four image display devices.

When the image of a popular song broadcast received by the tuner 13 and the image of a person photographed by the video camera 11 are so displayed as to allow the positions of their display to overlap, it is made possible to obtain an image illustrating a scene as though the photographed person was dancing on a stage together with the person appearing in the popular song broadcast.

Figure 4:
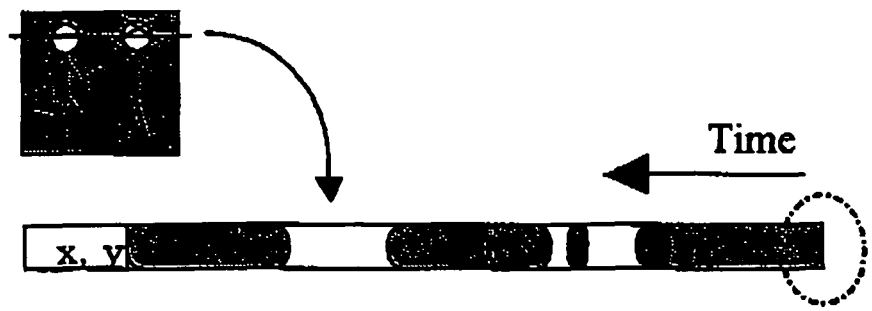
FIG. 4 is a schematic diagram illustrating an example of image signal in one line of the display device of this invention.

The image received by the tuner 12 of FIG. 3 is displayed on the unit display device 23. The image signal in one line of this display is illustrated in FIG. 4. The following description will be made with attention focused on the image signal indicated by a horizontal line drawn across an image plane. It is assumed that the position for starting display of the image signal of this one line falls at (1310, 400), i.e. the right end of the line of (x, y), and the image plane of the image display device measures 640 dots in width and 480 dots in height. The left lower image display device judges this image signal packet to fall outside the range of image display, alters the value of the x coordinate to 670 (=1310−640) resulting from deducting the value of the size of the image plane, and outputs this result via the right output terminal. The second image display device which has received this image signal packet similarly alters the value of the x coordinate to 30 (=670−640) resulting from deducting the value of the size of the image plane and outputs the result via the right output terminal. The third image display device which has received this image signal packet, owing to the fact that the position for starting display falls in the range of display, divides the image signal packet into the part inside and the part outside the range of display (the part outside the range is empty in the illustrated case) and displays the part inside the range in the display part.

The automatic transfer of the image signal packet in the upper direction has the same mechanism as above. The vertically and bilaterally connected image display devices altogether complete an image exhibiting a matching property.

Figure 5:
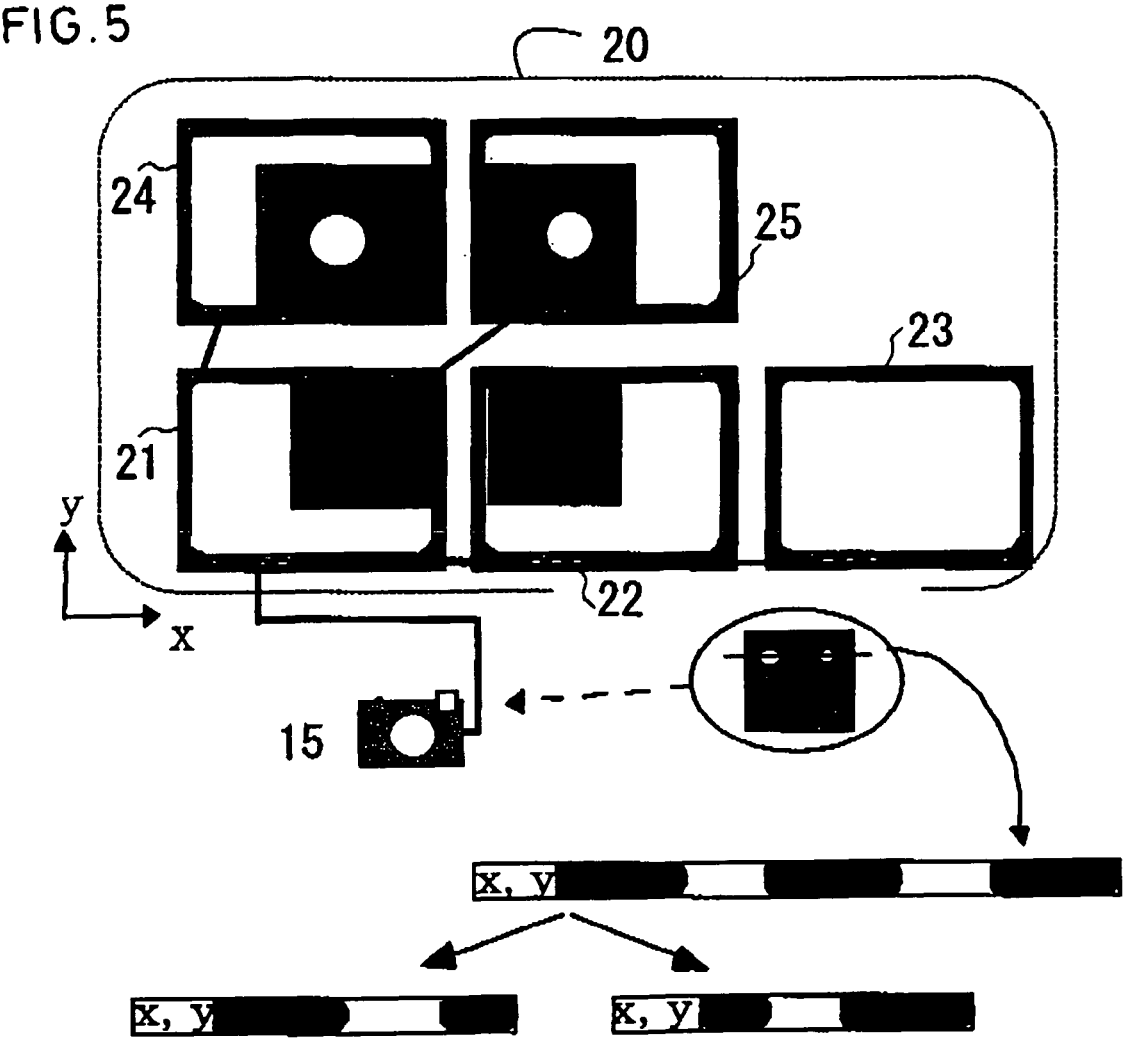
FIG. 5 is a schematic diagram illustrating the mechanism of an example of the image display apparatus of this invention divided into four display devices.

FIG. 5 illustrates a mechanism for enabling an image of a digital camera, for example, to be displayed as divided in four unit display devices as in an example of the image display apparatus of this invention. The following description will be made with attention focused on the image signal indicated with a horizontal line in the image plane. It is assumed that the position for starting display (x, y) of the image signal of this one line falls at (50, 900), the image has a length of 1024 dots, and the image plane of the image display device measures 640 dots in width and 480 dots in height. The left lower image display device judges this image signal packet to fall outside the range of image display and alters the value of the y coordinate to 420 (=900−480) resulting from deducting the value of the size of the image plane. Further, since the width exceeds the size of the image plane, this image display device divides the image signal packet into image signal packets having image lengths of 590 (=640−50) dots and 534 (=1024−490) dots and fixes the position for starting display (x, y) of the latter signal packets at (50, 0). The former one of the divided image signal packets is output via the output terminal for the upper side of the display device 21. The latter one of the divided image signal packets is output via the output terminal for the right upper side of the display device 21.

The upper and the right upper image display devices which have received these image signal packets, owing to the fact that the positions for starting display both fall in the range of display, divide the image signal packets each into a part inside and a part outside the range of display (the part outside the range is empty in this case) and display the parts inside the range in the display part.

Figure 6:
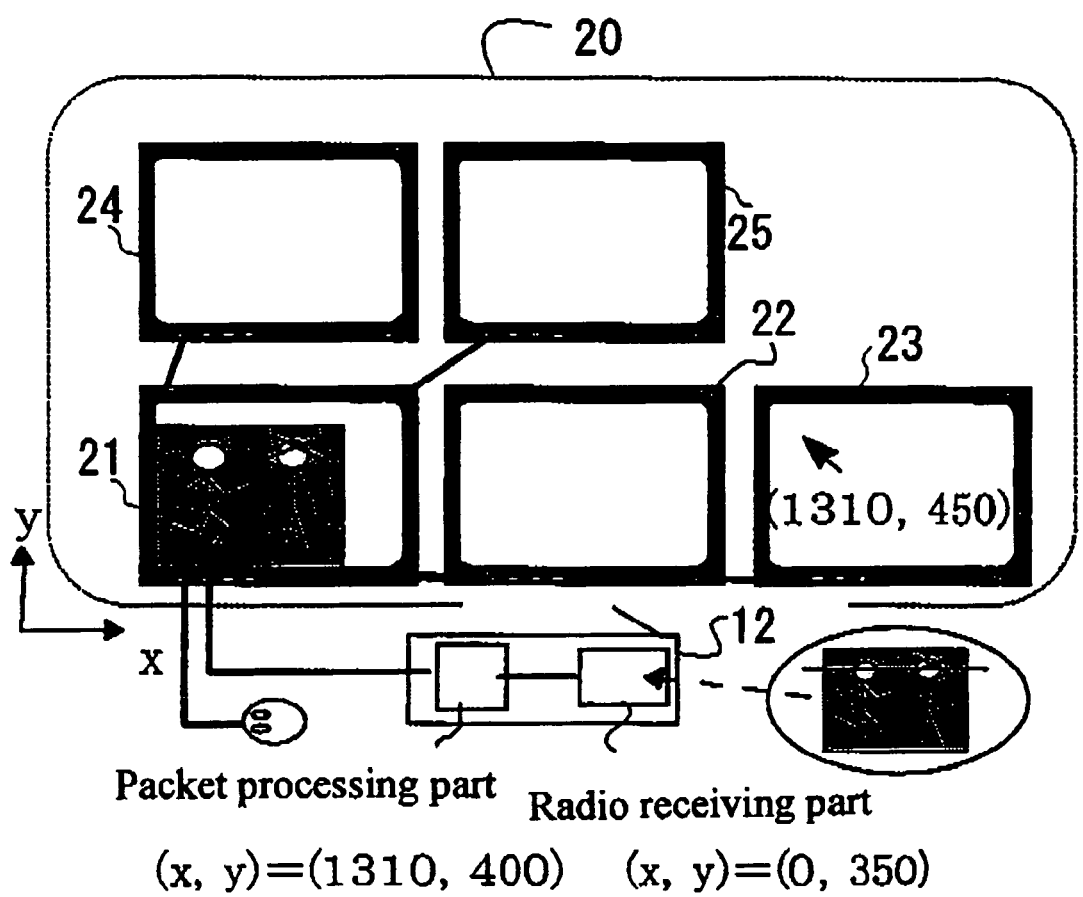
FIG. 6 is a schematic diagram illustrating an example of the procedure for causing an image received by a tuner to be displayed on the display device in accordance with an instruction given by the user.

FIG. 6 illustrates one example of the procedure to be followed in causing an image received by the tuner 12 to be displayed by the display device 23 in accordance with the user's instructions. The tuner 12 comprises a radio receiving part for receiving a television broadcast and outputting such an image signal packet as allows an origin (0, 0) to fall on the left lower side and a packet processing part for processing a position for starting display in accordance with the external instructions from the user. Since the tuner 12 is consequently enabled to output such an image signal packet as allows an origin (0, 0) to fall on the left lower side, the output is displayed in the image display apparatus 20 as illustrated in FIG. 5.

The case in which the user of this image display apparatus 20 instructs the display position of his own choice by the use of a mouse, for example, will be described below. When the user designates (1310, 450) as the display position of the left upper side of an image, for example, the click he gives to the mouse causes the designated data to be transmitted to the tuner 12. The packet processing part of the tuner 12 which has received the designated data adds (1310, 50) to the position for starting display of the image signal packet output by the radio receiving part so as to allow coincidence of the position (0, 400) of the left upper side of the output image of the tuner 12 with the designated position (1310, 450) and outputs the result of this addition. In the television broadcast image plane of FIG. 4, the position (x, y)=(0, 350) for starting display of the image signal from the radio receiving part in one line indicated by a horizontal line is altered by the packet processing part to (1310, 400) and output in the altered form.

Figure 7A:
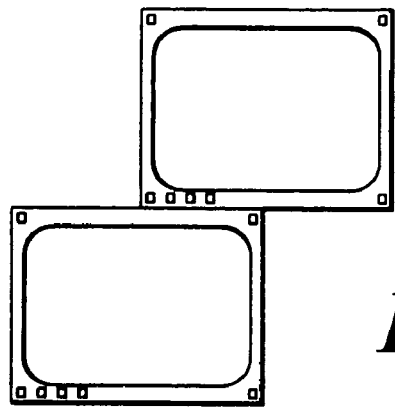
FIG. 7($a$) is a schematic diagram illustrating an example of a unit display device and FIG. 7($b$) a schematic diagram illustrating an image display apparatus configured with unit display devices.
Figure 7B:
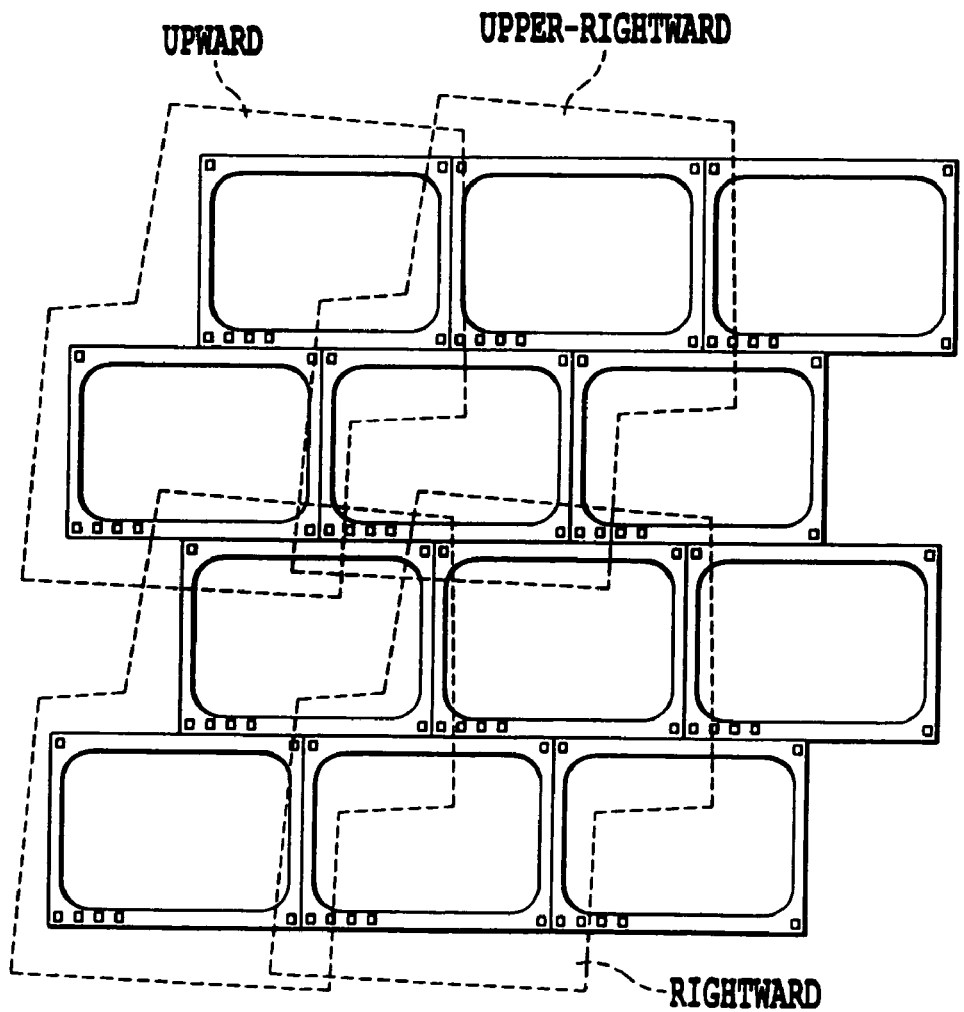

Though the display part of FIG. 2 is assumed to have one display image plane in the foregoing description, an alignment having a deviating phase as shown in FIG. 7(b) may be obtained by repeating such a unit display device as shown in FIG. 7(a), for example. In this case, the unit display device as shown in FIG. 7(a) may be configured by the method of this invention or by the conventional method. Further, this unit display device has only to produce an output for use in each of the directions possessing translational objectivity.

A distinction button so to speak can be established by designating an optional region on a display and providing this region with a button, the depression of which results in enhancing the resolution of an image in that region, and rendering the image in that region distinct or, in the case of a moving image, this distinction button can be established by using means to heighten the refresh rate of the image instead of or in conjunction with the enhancement of the resolution. As regards this concept, the practice of varying the resolution of an image wholly in conformity with instructions has been in vogue heretofore.

The adoption of this option, in an environment in which the communication band as utilized for a network is restricted, enables the whole communication band to be suppressed to a low level while allowing a necessary part of an image to be displayed with high definition and ensures ideal response and accomplishes provision of service at a low communication charge.

Figure 8:
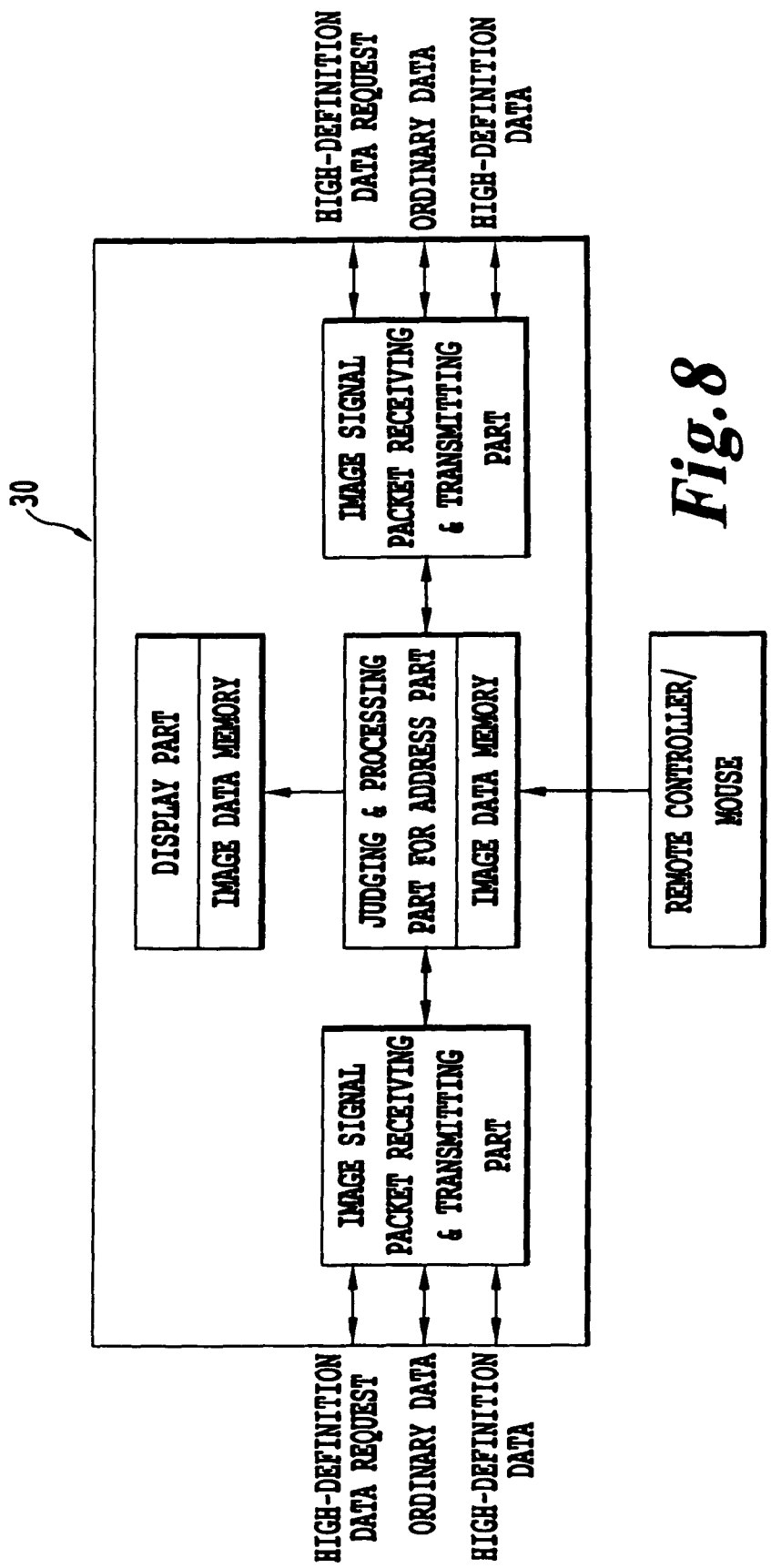
FIG. 8 is a block diagram illustrating the inside structure of a display device partaking in the construction of the image display apparatus, intended to display a high-definition image in a selected region.
Figure 9:
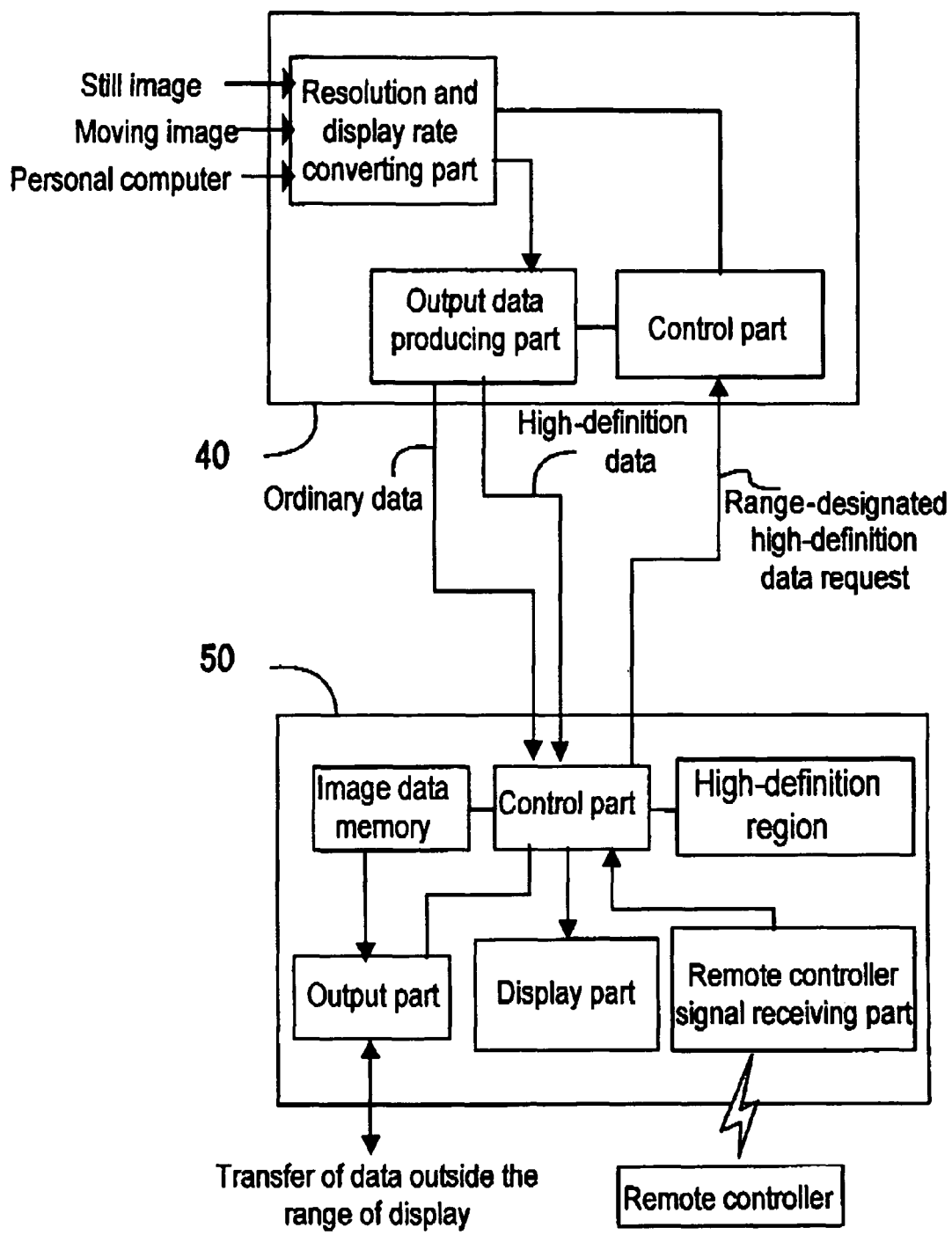
FIG. 9 is a block diagram illustrating the inside structure of a display device partaking in the construction of the image display apparatus, intended to input in a selected region a region for displaying a high-definition image.

For the purpose of realizing this option, an apparatus as the source of transmission of an image or a projected image is instructed to send the data exclusively in the designated region with high definition by the use of a circuit of FIG. 8 or FIG. 9. The source of transmission transmits high-definition data containing the coordinates of the relevant part. As a result, it is made possible to increase the amount of the data and enhance the resolution in the designated part while the resolution in the remainder of the region is kept at a suppressed level.

A method for sending such partial high-definition data as mentioned above, when the high-definition data is in a rectangular shape, consists in first giving notice of the information concerning the position of the origin of a rectangle (the right upper apex, for example), the length of the rectangle and the resolution and subsequently sending the data exclusively (the sequence of sending the data is properly decided as from the right upper side toward the left and, when the left side is reached, again from the right in the first row directly below, for example), with the result that the rectangular range will be successfully displayed. When the resolution of the data in this case falls short of the resolution of the display apparatus, the shortage may be properly complemented.

In the recognition of disposition of a multiplicity of image planes by a method using connecting ports corresponding to relevant positions, when a multiplicity of image planes are used wholly as a large image plane, it is necessary that the individual display device be so prepared as to recognize their positional relations and function collectively. Preferably, this preparation is effected by a simple adjustment.

The display device to be connected to another display device, for example, necessitates preparation of four connection ports for use at vertical and bilateral points, uses as the origins the coordinates of the display device that has entered an image signal, obtains image data resulting from rewriting the image signal into position data by subtracting the number of pixels of the display device in the vertical and lateral directions in accordance with the connecting ports of the display device in the vertical and bilateral directions from the origins, and transmits the image data. Simultaneous input to a plurality of display devices is also feasible, on the condition that the image signal devices individually have origins of their own. The positions for display of images that are obtained by this method are initialized values. The user is allowed afterward to alter these positions for display of the images to suit his convenience. In this case, the user has only to alter the position data of images while the positions of the origins on the display device side are kept intact.

In accordance with the method proposed above, the simultaneous display in the plurality of display devices is accomplished by merely connecting the display devices to the vertical and bilateral ports in conformity with the positions of the image planes without requiring any special procedure for the recognition of dispositions.

Figure 10A:
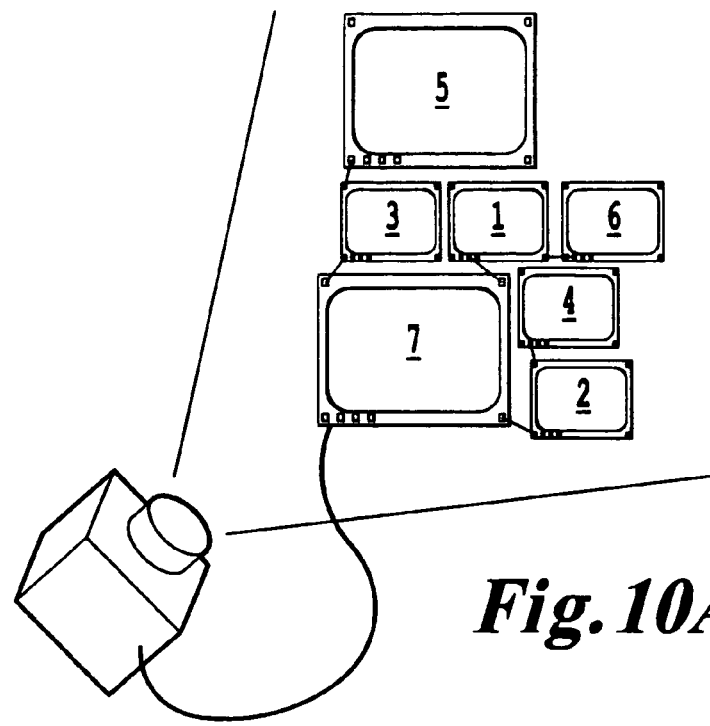
FIG. 10 is a schematic diagram illustrating a setup for effecting recognition of dispositions of display devices, FIG. 10($a$) showing the connection of a camera to one of display devices and FIG. 10($b$) showing a disposition recognizing device.

In the recognition of the dispositions of a multiplicity of image planes by a method using a camera, all the connected display devices are enabled to comprehend automatically the information of their own positions (also detect the resolution) by connecting a camera to any of the display devices as illustrated in FIG. 10(a), keeping the whole group of display devices cast in that display image, and issuing to that display device instructions to effect automatic recognition of dispositions.

After the display device has been connected, it is made to exchange the information such as of the ID and the resolution proper to the device and have the new information registered. The display device, on receiving instructions to effect automatic recognition of dispositions, sends to the display devices of varying IDs including itself a projected image capable of discriminating them from the other display devices (indicating the display devices required to be discriminated in red and the other display devices in blue, for example) and detects the position of the device by processing the camera image. By informing all the display devices of the result of detection, the individual displays are enabled to know the information of their own positions. Since this function resides wholly on the display device side, the camera may be of an ordinary grade.

Figure 10B:
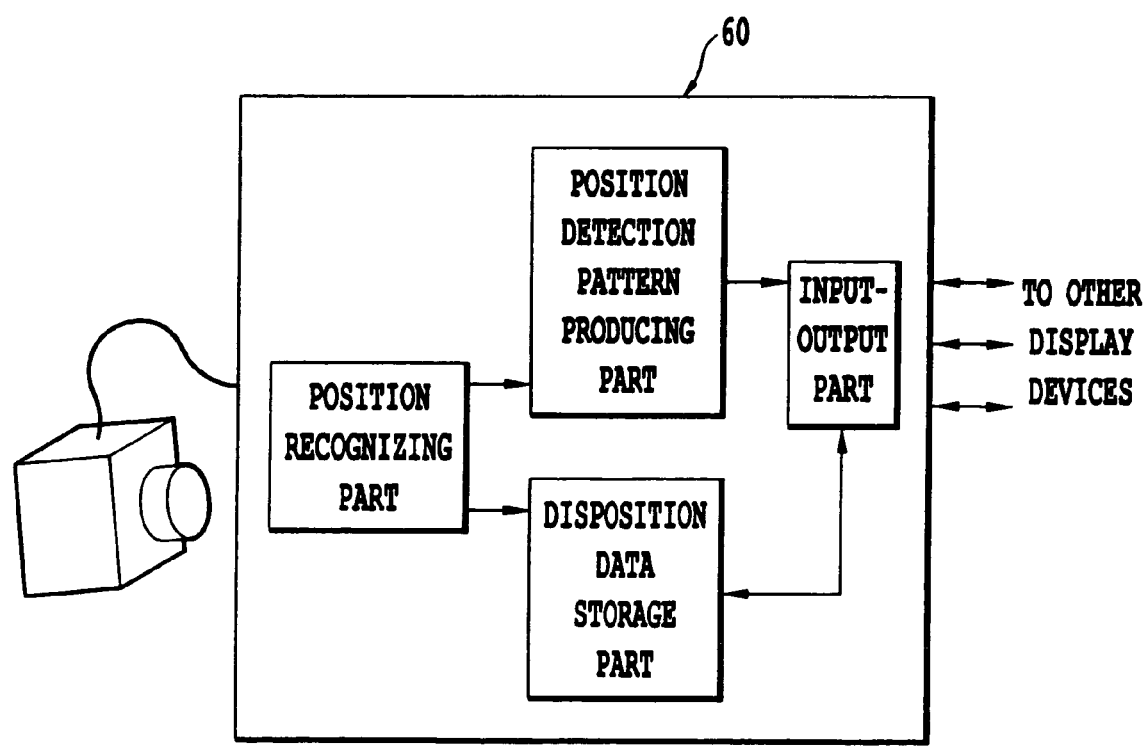

In the recognition of dispositions of a multiplicity of image planes by a method using ID display, the display devices are so adapted that when instructions to effect automatic recognition of disposition is issued to any of the display devices through a circuit illustrated in FIG. 10(b), the other display devices are caused to output pertinent numbers. Meanwhile, the display device that has received the instructions to effect automatic recognition of disposition is adapted to show the group of icons of the display devices containing corresponding numerals. Then, the user is enabled to recognize the dispositions of the multiplicity of image planes by arranging by remote control these icons in the actual positional relation of the display devices.

These icons are enabled to reflect their actual sizes by dint of display information, such as the resolution, for example.

Thus, the recognition of dispositions can be realized without requiring a camera. Though the individual displays are mutually connected and are consequently exchanged in information, they are ignorant of their positional relations. The user, therefore, is required to teach them the positional relations by using a representative display device.

What is claimed is:

1. An image display device for displaying image signals of a form of packets incorporating display position information, comprising:
    a combination of unit display devices so as to acquire translational objectivity, each of the unit display devices including:
    a receiving part for receiving image signals,
    a processing part for dividing input image signals into those falling inside and those falling outside a range for display or those subject to or those not subject to display based on the display position information and serving to process display positions of the image signals falling outside the range for display or not subject to display, an output part for outputting the processed image signals along an axis of translational objectivity to a subsequent unit display device, and a display part for displaying the images falling in the range for display, the image display apparatus displaying the image signals as a whole, with the image signals processed sequentially with the unit display devices, wherein the processing part outputs the display position information that results from causing a portion of a size of a display region allocated to a unit display device to which the processing part belongs to be deducted from a display position of an image signal.

2. An image display device according to claim 1, wherein the unit display devices individually have one display surface and are aligned in rows and columns.

3. An image display device according to claim 1, wherein the unit display devices individually have two display surfaces formed collectively in a staggered pattern and are aligned in rows and columns.

4. An image display device according to claim 1, wherein the unit display devices are individually provided with an input terminal and output terminals connected to different unit display devices having translational objectivity in respective directions.

5. An image display device according to claim 1, wherein the unit display devices are individually provided with means for displaying by default a pattern varied by an external request and means for inputting a pattern position proper to the relevant unit display device or aligning the proper patterns to derive disposition of the relevant unit display devices.

6. An image display device for displaying image signals of a form of packets incorporating display position information, comprising:
   a combination of unit display devices so as to acquire translational objectivity, each of the unit display devices including:
      a circuit for selecting an arbitrary display region from the image display apparatus;
      a circuit for supplying the selected display region with a higher definition data containing the coordinates of the selected display region than a definition data sent to other region excluding the selected display region;
      a circuit for displaying the higher definition data in the selected display region;
      a receiving part for receiving image signals;
      a processing part for dividing input image signals into those falling inside and those falling outside a range for display or those subject to or those not subject to display based on the display position information and serving to process display positions of the image signals falling outside the range for display or not subject to display;
      an output part for outputting the processed image signals along an axis of translational objectivity to a subsequent unit display device; and
      a display part for displaying the images falling in the range for display,
   the image display apparatus displaying the image signals as a whole, with the image signals processed sequentially with the unit display devices.

7. An image display device for displaying image signals of a form of packets incorporating displayposition information, comprising:
   a combination of unit display devices so as to acquire translational objectivity, each of the unit display devices including:
      a receiving part for receiving image signals,
      a processing part for dividing input image signals into those falling inside and those falling outside a range for display or those subject to or those not subject to display based on the display position information and serving to process display positions of the image signals falling outside the range for display or not subject to display,
      an output part for outputting the processed image signals along an axis of translational objectivity to a subsequent unit display device, and
      a display part for displaying the images falling in the range for display, the image display apparatus displaying the image signals as a whole, with the image signals processed sequentially with the unit display devices,
   wherein the processing part outputs the display position information that results from causing a portion of a size of a display region allocated to a unit display device to which the processing part belongs to be deducted from a display position of an image signal,
   wherein one unit display device to be connected to another unit display device is provided with four or eight connecting ports for use in vertical and bilateral sides or in part intermediate such sides, and the unit display devices individually have a function of transmitting image data rewritten into position data minus or position data plus a number of pixels of the relevant display devices in vertical and bilateral directions in accordance with the connecting ports in the vertical and bilateral directions of the display device.

8. An image display device according to claim 7, wherein the unit display devices individually have one display surface and are aligned in rows and columns.

9. An image display device according to claim 7, wherein the unit display devices individually have two display surfaces formed collectively in a staggered pattern and are aligned in rows and columns.

10. An image display device according to claim 7, wherein the unit display devices are individually provided with an input terminal and output terminals connected to different unit display devices having translational objectivity in respective directions.

11. An image display device according to claim 7, wherein the unit display devices are individually provided with means for displaying by default a pattern varied by an external request and means for inputting a pattern position proper to the relevant unit display device or aligning the proper patterns to derive disposition of the relevant unit display devices.

12. An image display device for displaying image signals of a form of packets incorporating display position information, comprising:
   a combination of unit display devices so as to acquire translational objectivity;
   an imaging camera connected to any one of the unit display devices; and
   a circuit for issuing instructions through the unit display device connected with the imaging camera to effect automatic recognition of dispositions to read position information of each of the unit display devices from a contrast between an input image signal and an image of the input image signal shown in each of the unit display devices with a whole image display apparatus visualized in the image display apparatus,
   wherein each of the unit display devices includes:
      a receiving part for receiving image signals;

a processing part for dividing input image signals into those falling inside and those falling outside a range for display or those subject to or those not subject to display based on the display position information and serving to process display positions of the image signals falling outside the range for display or not subject to display;

an output part for outputting the processed image signals along an axis of translational objectivity to a subsequent unit display device; and a display part for displaying the images falling in the range for display, and for sending to all other unit display devices a projected image capable of discriminating itself from the other unit display devices when receiving instructions to effect automatic recognition of dispositions, then detects its position by processing the camera image and informs the other unit display devices of its position acquired through the detection, the image display apparatus displaying the image signals as a whole, with the image signals processed sequentially with the unit display devices.

* * * * *